US006821620B2

(12) United States Patent
Namikawa et al.

(10) Patent No.: US 6,821,620 B2
(45) Date of Patent: Nov. 23, 2004

(54) CLEANING SHEET, CONVEYING MEMBER USING THE SAME, AND SUBSTRATE PROCESSING EQUIPMENT CLEANING METHOD USING THEM

(75) Inventors: Makoto Namikawa, Ibaraki (JP); Yoshio Terada, Ibaraki (JP); Eiji Toyoda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 2 days.

(21) Appl. No.: 10/311,065

(22) PCT Filed: May 8, 2001

(86) PCT No.: PCT/JP01/03849

§ 371 (c)(1), (2), (4) Date: Dec. 13, 2002

(87) PCT Pub. No.: WO02/05975

PCT Pub. Date: Jan. 24, 2002

(65) Prior Publication Data

US 2003/0180532 A1 Sep. 25, 2003

(30) Foreign Application Priority Data

| | | |
|---|---|---|
| Jul. 13, 2000 | (JP) | P2000-230340 |
| Jul. 14, 2000 | (JP) | P2000-215233 |
| Nov. 16, 2000 | (JP) | P2000-349840 |
| Dec. 27, 2000 | (JP) | P2000-399103 |
| Jan. 12, 2001 | (JP) | P2001-004634 |

(51) Int. Cl.[7] .......... B32B 27/30
(52) U.S. Cl. .......... 428/355 AC; 428/41.5; 428/41.8; 428/41.9; 428/343; 428/352
(58) Field of Search .......... 428/355 AC, 41.5, 428/41.8, 41.9, 343, 352, 922, 354

(56) References Cited

U.S. PATENT DOCUMENTS

| | | | | | |
|---|---|---|---|---|---|
| 5,194,327 | A | * | 3/1993 | Takahashi et al. | 428/327 |
| 5,208,103 | A | * | 5/1993 | Miyamoto et al. | 428/354 |
| 5,326,966 | A | * | 7/1994 | Fukuda et al. | 235/493 |
| 5,378,405 | A | | 1/1995 | Gutman et al. | |
| 5,902,678 | A | | 5/1999 | Konda et al. | |
| 6,055,392 | A | | 4/2000 | Huver et al. | |
| 6,126,772 | A | | 10/2000 | Yamamoto et al. | |

FOREIGN PATENT DOCUMENTS

| | | |
|---|---|---|
| EP | 7-128368 | 5/1995 |
| EP | 10-154686 | 6/1998 |
| EP | 0 930 538 | 7/1999 |
| JP | 10-154686 | 6/1998 |
| JP | 11-87458 | 3/1999 |
| JP | 0930538 A1 * | 7/1999 |
| JP | 2000-191991 | 7/2000 |
| JP | 2000-260671 | 9/2000 |
| JP | 2001-131508 | 5/2001 |
| WO | WO 97/00534 | 1/1997 |

* cited by examiner

*Primary Examiner*—David J. Buttner
*Assistant Examiner*—Christopher Keehan
(74) *Attorney, Agent, or Firm*—Sughrue Mion, PLLC

(57) ABSTRACT

A cleaning sheet has a cleaning layer having a surface resistivity not less than $1\times10^{13}$ Ω/□. In a method of manufacturing a conveying member with a cleaning function, for sticking the cleaning sheet, in which the cleaning layer formed of an adhesive that is polymerized/cured by an active energy is provided onto one surface of a base material and an ordinary adhesive layer is provided onto the other surface thereof, onto the conveying member via an ordinary adhesive layer to have a shape larger than the shape of the conveying member and then cutting the cleaning sheet along a shape of the conveying member, wherein a polymerizing/curing reaction of the cleaning layer is carried out after the cleaning sheet is cut out into the shape of the conveying member.

19 Claims, No Drawings

CLEANING SHEET, CONVEYING MEMBER USING THE SAME, AND SUBSTRATE PROCESSING EQUIPMENT CLEANING METHOD USING THEM

TECHNICAL FIELD

The present invention relates to a sheet for cleaning various devices, a cleaning sheet for a substrate processing equipment that is very susceptive to influences from the foreign matter, for example, a manufacturing system, a test system, etc. for a semiconductor device, a flat panel display, a printed substrate, etc., and a conveying member using the same, and a substrate processing equipment cleaning method using them.

BACKGROUND ART

Various substrate processing equipments convey the substrate while physically contacting the substrate to respective conveying systems. At that time, if the foreign matter is stuck to the substrate and the conveying system, subsequent substrates are contaminated sequentially, and thus the equipment must be stopped periodically and subjected to the cleaning process. For this reason, there is the problem such that the reduction in the rate of operation is caused and the great labor is needed. In order to overcome these problems, the method of cleaning/removing the foreign matter adhered to the inside of the substrate processing equipment by conveying the substrate to which the adhesive substance is adhered (For example, Unexamined Japanese Patent Publication 10-154686), the method of removing the foreign matter adhered to the back surface of the substrate by conveying the plate-like member (Unexamined Japanese Patent Publication 11-87458), the method of employing the dummy wafer charged by the corona charge (Unexamined Japanese Patent Publication 2000-260671), etc. were proposed.

The method of cleaning/removing the foreign matter adhered to the inside of the substrate processing equipment by conveying the substrate to which the adhesive substance is adhered is the effective method to overcome the above subjects. However, there is such a possibility that the adhesive substance is not released because the adhesive substance and the equipment contact portion are too strongly adhered not to release, so that there is such a possibility that the substrate cannot be surely conveyed. Particularly, if the low pressure sucking mechanism is employed in the chuck table of the table, such possibility is great. Also, the method of removing the foreign matter by conveying the plate-like member can execute the conveyance without hindrance, but there is the problem that the vital dust removing characteristic is inferior. Also, the method of employing the dummy wafer charged by the corona charge is the effective method that can also remove the foreign matter in the neighborhood of the wafer, but the corona generation potential must be set higher if the surface potential is tried to increase. Thus, if the cleaning sheet is employed as in the present invention, the corona processing conditions are not strongly set because the holes are opened depending on the constituent material, and also the surface potential cannot be increased. Therefore, the surface potential can be charged up to only several tens V by the corona method and thus the suction of the foreign matter is not sufficient yet.

DISCLOSURE OF INVENTION

The present invention has been made in light of such circumstances, and it is an object of the present invention to provide a cleaning sheet that makes it possible to convey the substrate in the substrate processing equipment without fail and also to simply reduce the foreign matters adhered to the equipment.

In order to achieve the above object, as the result of the earnest study, it was found that a cleaning sheet or a conveying member can be conveyed in the substrate processing equipment without fail and foreign matters can be simply and certainly removed by conveying the cleaning sheet or the conveying member having the cleaning sheet such as a substrate to remove foreign matters away from the interior of a substrate processing equipment, wherein an adhesive layer as a cleaning layer has a surface resistivity not less than a specific value, or has a relative dielectric constant or a surface potential not less than a specific value, or has a surface free energy not less than a specific value, to thereby achieve the present invention.

That is, the present invention relates to a cleaning sheet having a cleaning layer whose surface resistivity is not less than $1\times10^{13}$ Ω/□. The cleaning sheet may be provided with a base material. The cleaning layer set forth may be provided on one surface of a base material and an ordinary adhesive layer may be provided on another surface thereof. A relative dielectric constant of the cleaning layer is preferably larger than 2.0. A surface free energy of the cleaning layer is preferably not less than 30 mJ/m2. A surface potential of the cleaning layer preferably exceeds 10 kV. The cleaning layer may be formed as an electret by a thermal electret method. The above cleaning sheets may be further modified from other aspects.

Features and advantages of the invention will be evident from the following detailed description of the exemplary embodiments.

Exemplary Embodiments for Carrying Out the Invention

The cleaning sheet of the present invention has a cleaning layer (including the cleaning layers as modes such as a cleaning sheet single body, a laminated sheet, a laminated sheet of the cleaning sheet and a base material, or the like hereinafter) whose surface resistivity is not less than $1\times10^{13}$ Ω/□, preferably not less than $1\times10^{14}$ Ω/□. In the present invention, since the cleaning layer is formed as close to the insulator as possible by designing the surface resistivity of the cleaning layer to exceed a specific value, there can be achieved such an advantage that the foreign matters caused by not only the adhesion but also the static electricity can be caught and adsorbed. Accordingly, in case the surface resistivity is set below $1\times10^{13}$ Ω/□, the capture/adsorption effect of the foreign matters caused by such static is remarkably lowered.

Further, it is desirable that the above cleaning layer should be formed of material whose relative dielectric constant measured under following conditions is larger than 2.0, preferably not less than 2.1 and more preferably from 2.1 to 10. In the present invention, since the cleaning layer is formed close to the high-dielectric material as much as possible by designing the relative dielectric constant of the cleaning layer to exceed such specific value, there can be achieved such an advantage that the foreign matters caused by the static electricity can be caught and adsorbed.

The relative dielectric constant signifies the magnitude of the electrical energy stored when the electric field is applied to the material by using a ratio to the dielectric constant in a vacuum, and measured based on JIS K6911.

The material, the design method, etc. of such cleaning layer is not particularly limited inasmuch as the relative dielectric constant is set within the above range. In the present invention, it is preferable that the organic material that does not contain conductive material such as the additive having the electrically conducting function should be employed. As particular examples, for example, in addition to the material obtained by causing the compound, that has one unsaturated double bond or more in the molecule, to contain into the pressure-sensitive adhesive polymer, there may be employed preferably rubbers, natural resins, synthetic resins such as polyethylene terephthalate, phenol resin, polyester resin, alkyd resin, epoxy resin, polycarbonate, cellulose nitrate, poly(vinylidene fluoride), polypropylene, polyimide, nylon 6, nylon 66, poly(methyl methacrylate), methyl methacrylate/styrene copolymer, ethylene fluoride/propylene copolymer, etc.

Also, it is desired that the surface free energy of the cleaning layer should be not less than 30 mJ/m$^2$, preferably from 40 to 60 mJ/m$^2$. In the present invention, the surface free energy of the cleaning layer (solid state) signifies the surface free energy value of the solid state that is obtained by measuring contact angles of the water and the methylene iodide to the surface of the cleaning layer respectively, then substituting this measured value and the surface free energy values (already known in the reference) of the contact angle measured liquids into a following equation 1 derived from the Young's equation and the extended Fowkes' equation, and then solving two resultant equations as a simultaneous linear equation.

$$(1+\cos\theta)\gamma_L=2\sqrt{(\gamma_s{}^d\gamma_L{}^d)}+2\sqrt{(\gamma_s{}^P\gamma_L{}^P)} \qquad \text{<Equation 1>}$$

where each symbol in the equation is given as follows respectively.

θ: contact angle $\gamma_L$: surface free energy of the contact angle measured liquid $\gamma_L{}^d$: dispersion force component in $\gamma_L$ $\gamma_L{}^P$: polar force component in $\gamma_L$ $\gamma_s{}^d$: dispersion force component in the surface free energy of the solid state $\gamma_s{}^P$: polar force component in the surface free energy of the solid state The cleaning sheet is preferably designed such that the surface of the cleaning layer exhibits a contact angle of not more than 90 degrees, more preferably from 80 to 50 degrees with respect to water. In the invention, by designing the cleaning layer such that it exhibits a surface free energy and a contact angle with respect to water falling within the range defined above, an effect to cause the cleaning layer to remove the foreign matters stuck to the position to be cleaned can be exerted during conveying of the cleaning sheet or the like.

Also, it is desirable that the modulus of elasticity in tension of the cleaning layer (based on the test method JIS K7127) should be set not larger than 2000 N/mm$^2$, preferably larger than 1 N/mm$^2$. If the modulus of elasticity in tension is designed in such range, the cleaning layer does not have substantially the tackiness and thus the foreign matter can be removed not to generate the conveyance trouble.

It is preferable that the surface potential of the cleaning layer is set to exceed 10 kV, normally about 10 to 50 kV. In the present invention, it may be considered that, if the cleaning layer has the surface potential in such specific range, the electric field is formed around the cleaning layer to have a strong adsorption force and thus the dust removing effect can be obtained due to the adsorption force even in the situation that the cleaning layer does not have substantially the tackiness, as described later.

The method of maintaining such surface potential is not particularly limited. For example, the method of forming various polymers as the electret by the thermal electret method, etc. (referred to as "electret formation" hereinafter), the method of suppressing the discharge by selecting the material with the high volume resistivity to reduce a current flowing in the material, etc. may be listed.

The material, etc. of such polymer are not limited as far as the polymer can be formed as the electret. For example, the polymers such as polypropylene, polyethylene terephthalate, polyethylene naphthalate, poly(vinylidene fluoride), vinylidene fluoride, vinylidene trifluoride, polytetrafluoroethylene, etc, the curing pressure-sensitive adhesive composition in which the crosslinking reaction and the curing is accelerated by the active energy source such as the ultraviolet ray, the heat, etc. described later, etc. may be listed.

Also, it is preferable that the cleaning layer of the present invention should not have substantially the tackiness. Where "not have substantially the tackiness" signifies that, if the essential property of the tackiness is assumed as the friction as the resistance against the slip, no pressure-sensitive tack representative of the adhesive function is present. This pressure-sensitive tack appears if the modulus of elasticity of the adhesive material is in the range up to 1 N/mm$^2$ in compliance with the Dahlquist's standard, for example. Accordingly, in the present invention, if the modulus of elasticity in tension is designed in a specific range, i.e., in the range of 1 to 3000 N/mm$^2$, preferably 100 to 2000 N/mm$^2$ such that the modulus of elasticity can be increased larger than 1 N/mm$^2$, the foreign matter can be removed not to generate the conveyance trouble. Where the modulus of elasticity in tension is measured based on the test method JIS K7127.

It is preferable that the material whose modulus of elasticity in tension can be enhanced by accelerating the crosslinking reaction and the curing by the active energy source such as the ultraviolet ray, the heat, etc. should be selected as such cleaning layer. Further, it is preferable that the wettability between the cleaning layer and the cleaned portion in the equipment should be small. If such wettability is large, there is the possibility that the cleaning sheet is stuck tightly to the cleaned portion in conveying to cause the conveyance trouble. Also, a thickness of the cleaning layer is not particularly limited, but normally the thickness is set to about 5 to 100 μm.

The material, etc. of such cleaning layer is not particularly limited inasmuch as the surface resistivity is within the above range. But the adhesive layer that does not contain the conductive material such as the additive having the conducting function is preferable. In addition, the material that can be cured by the active energy source such as the ultraviolet ray, the heat, etc. to change the molecular structure into three-dimensional net and to lower the adhesive force is preferable as such adhesive layer. For example, the 180° releasing adhesive force for the silicon wafer (mirror surface) is not more than 0.20 N/10 mm, preferably about 0.010 to 0.10 N/10 mm. If this adhesive force exceeds 0.20 N/10 mm, there is the chance that the cleaning layer is adhered to the cleaned portion in the equipment in conveying to cause the conveyance trouble.

The material, etc. of such cleaning layer is not particularly limited inasmuch as the surface free energy is below the above specific value. But the adhesive layer that can be cured and crosslinked by the active energy source such as the ultraviolet ray, the heat, etc. to change the molecular structure into three-dimensional net and to lower or lose the adhesive force is preferable. If such adhesive layer is employed, the cleaning layer is never strongly adhered to the cleaned portion during the conveying and thus the cleaning layer can be conveyed without fail.

As the particular examples of such cleaning layer, the material obtained by causing at least the compound, that has one unsaturated double bond or more in the molecule, and the polymerization initiator to contain into the pressure-sensitive adhesive polymer, and the material whose adhesiveness is lost by generating the polymerization and curing reaction by applying the active energy may be listed. As such pressure-sensitive adhesive polymer, for example, there may be listed the acrylic polymer that contains (metha)acrylic acid and/or (metha) acrylic ester selected from acrylic acid, acrylic ester, methacrylic acid, and ester methacrylate as the main monomer. In synthesizing this acrylic polymer, the compound that that has two unsaturated double bonds or more in the molecule may be employed as the copolymerization monomer, otherwise this polymer itself may be caused to take part in the polymerization and curing reaction by the active energy if the unsaturated double bonds are introduced into the molecules of the acrylic polymer by chemically bonding the compound having the unsaturated double bonds to the molecules of the synthesized acrylic polymer via the reaction between the functional groups.

Here, the compound that is nonvolatile and is the low molecular weight substance having the weight-average molecular weight of less than 10000 is preferable as the compound that has one unsaturated double bond or more in the molecule (referred to as "polymerized unsaturated compound" hereinafter). It is preferable particularly that the compound that has the molecular weight of less than 5000 should be employed to execute the change of the adhesive layer into the three-dimensional net effectively in curing.

Here, the compound that is nonvolatile and is the low molecular weight substance having the weight-average molecular weight of not more than 10000 is preferable as the polymerized unsaturated compound. It is preferable particularly that the compound that has the molecular weight of not more than 5000 should be employed to execute the change of the cleaning layer into the three-dimensional net effectively in curing. As such polymerized compound, for example, there may be listed phenoxy polyethylene glycol (metha) acrylate, ϵ-caprolactone (metha)acrylate, polyethylene glycol di(metha)acrylate, polypropylene glycol di(metha)acrylate, trimethylpropane tri(metha)acrylate, dipentaerythritol hexa (metha)acrylate, urethane (metha) acrylate, epoxy(metha)acrylate, oligoester (metha)acrylate, etc. One type or two types of them may be employed.

Also, the polymerization initiator added to the cleaning layer is not particularly limited and the publicly known initiator can be employed. For example, there may be listed the thermal polymerization initiator such as benzoyl peroxide, azobisisobutyronitrile, etc. if the heat is employed as the active energy source, otherwise there may be listed the photopolymerization initiator such as benzoyl, benzoin ethyl ester, dibenzyl, isopropyl benzoin ester, benzophenone, Michler's ketone chlorothioxanthone, dodecylthioxanthone, dimethylthioxanthone, acetophenone diethyl ketal, benzyldimethyl ketal, α-hydroxycyclohexylphenyl ketone, 2-hydroxydimethylphenyl propane, 2,2-dimethoxy-2-phenylactophenone, etc. if the light is employed as the active energy source.

The base material used when such cleaning layer is provided to the base material is not particularly limited. But, for example, there may be listed the plastic film such as polyethylene, polyethylene terephthalate, acetylcellulose, polycarbonate, polypropylene, polyamide, polyimide, polycarbodiimide, etc. The thickness is normally about 10 to 100 μm.

Further, the present invention provides the cleaning sheet in which the cleaning layer is provided on the one side of the base material and the ordinary adhesive layer is provided on the other side thereof. The material, etc. of this ordinary adhesive layer are not particularly limited as far as the adhesive layer can satisfy the adhering function, and the ordinary adhesive (e.g., acrylic adhesive, rubber adhesive, etc.) may be employed.

According to such structure, the cleaning sheet is stuck onto the conveying member such as various substrates, other tape sheet, etc. via the ordinary adhesive layer and then conveyed as the conveying member with the cleaning function in the equipment to come into contact with the cleaned portion, whereby the cleaning is carried out. Also, if the substrate is peeled off from such adhesive layer after the cleaning to reuse the conveying member such as the above substrate, the adhesive force of such ordinary adhesive layer is not particularly limited if it is in the range to enable the peeling-off again. However, it is preferable that the 180° releasing adhesive force for the silicon wafer (mirror surface) should be less than 0.01 to 0.98 N/10 mm, particularly about 0.01 to 0.5 N/10 mm since the cleaning sheet is not peeled off during the conveying but can be easily peeled off again after the cleaning.

The conveying member to which the cleaning sheet is stuck is not particularly limited, but the substrate for the flat panel display such as the semiconductor wafer, LCD, PDP, etc., the substrate for the compact disk, the MR head, and others, for example, may be listed.

Also, the present invention provides a member for cleaning various conduction testers and a conduction tester cleaning method using this, for example, a cleaning member and a cleaning method for a conduction tester such as the semiconductor device, the printed substrate, etc., that is very susceptive to influences from the foreign matter.

Various conduction testers employed in the semiconductor manufacturing tests the electric conduction by bringing the contact point on the conduction tester side (the contact pin of the IC socket, etc.) into contact with the terminal on the product side (the semiconductor terminal, etc.). At that time, when the contact of the IC terminal and the contact pin is repeated by the test that is carried out repeatedly, the contact pin scrapes off the material (aluminum, solder, etc.) on the IC terminal side, then the foreign matter is transferred and adhered to the contact pin side, and then such adhered aluminum, solder, etc. are oxidized to cause the defective insulation. In the worst case, the conduction rate in the test is degraded. Therefore, in order to remove the foreign matter adhered to these contact pins, the foreign matter on the contact pins is removed by using the member obtained by coating the alumina fine-grains on the polyethylene terephthalate film, or the member obtained by mixing the abrasive grains into the rubber resin such as silicon (referred to as a contact pin cleaner hereinafter). However, in recent years, any countermeasure against the removal of the foreign matter on the chuck table is required with the reduction in thickness and the increase in length of the wafer in the semiconductor manufacturing steps since the wafer is broken due to the foreign matter on the test table (chuck table), the chucking error is generated, and others. For this reason, in order to remove the foreign matter on the chuck table, the necessity to stop periodically the equipment and to clean the table is generated. Therefore, there are problems such that the reduction in the rate of operation is caused and the huge labor is needed.

In light of such circumstance, the present invention has an object to provide a cleaning member and a cleaning method capable of cleaning contact pins of the conduction tester and reducing simply the foreign matters adhered to a chuck table, a conveying arm, etc.

In order to achieve the above object, as the result of the earnest study, the inventors of the present invention have found out that, if the cleaning member in which the cleaning layer for removing the foreign matter adhered onto the contacted surface (the chuck table, etc.) of the equipment, with which the contact pin cleaner comes into contact, is provided to one side of the member for removing the foreign matter adhered to the conduction testing pin of the conduction tester (referred to as a contact pin cleaner hereinafter) is conveyed, the cleaning of the contact pin and the removal of the foreign matter adhered to the chuck table, etc. in the test equipment can be performed simultaneously, and also, if the coefficient of friction of the cleaning layer is set to exceed a specific value, the cleaning layer can be conveyed in the test equipment without fail and the foreign matter can be reduced simply, and thus reach the completion of the present invention.

That is, the present invention provides a cleaning member which is the cleaning member for the conduction testing equipment and in which the cleaning sheet for removing the foreign matter adhered onto the contacted surface of the equipment, with which the contact pin cleaner comes into contact, is provided to one surface of the member for removing the foreign matter adhered to the conduction testing contact pin of the equipment (referred to as the contact pin cleaner hereinafter).

Also, the present invention provides a cleaning member which is the cleaning member for the conduction testing equipment and in which a member for removing the foreign matter adhered onto the conduction testing contact pin of the equipment is provided to one surface of the conveying member (referred to as the contact pin cleaner hereinafter), and the cleaning sheet for removing the foreign matter adhered to the contacted surface of the equipment, with which the contact pin cleaner comes into contact, is provided to the other surface.

The cleaning layer of the cleaning member of the present invention is not particularly limited if it can be conveyed surely in the testing equipment and it can reduce simply the foreign matter. But it is desirable from points of the dust removing characteristic and the conveying characteristic that the coefficient of friction should be not less than 1.0, preferably 1.2 to 1.8. There is the possibility that the cleaning layer cannot surely stick to the foreign matter on the chuck table if the coefficient of friction is smaller than 1.0, whereas there is the possibility that the conveying failure is caused if the coefficient of friction is too large. In the present invention, the coefficient of friction ($\mu$) of the cleaning layer is calculated by measuring the frictional resistance force (F), that is generated when the stainless steel plate (50 mm×50 mm flat plate) is slid with respect to a surface of the cleaning layer, by virtue of the universal tension tester and then substituting this frictional resistance force and the vertical load (W) applied to the steel plate at that time into a following equation 2. Where this coefficient of friction signifies the coefficient of dynamic friction herein.

$$\mu = F/W \quad \text{<Equation 2>}$$

Where each symbol in the equation is given as follows respectively.

$\mu$: coefficient of dynamic friction

F: frictional resistance force [N]

W: vertical load [N] applied to the steel plate

Also, it is desirable that the modulus of elasticity in tension of the cleaning layer should be set to not more than 2000 N/mm$^2$, preferably more than 1 N/mm$^2$. There is the possibility that the cleaning layer cannot surely stick to the foreign matter on the chuck table if the modulus of elasticity in tension exceeds 2000 N/mm$^2$, whereas there is the possibility that the conveying failure is caused if the modulus of elasticity in tension is below 1 N/mm$^2$. In the present invention, if the coefficient of friction and the modulus of elasticity in tension of the cleaning layer are set in such specific ranges, there can be achieved the advantage that the cleaning layer does not substantially have the tackiness at the time when the cleaning sheet, etc. are conveyed and thus the cleaning layer can be conveyed without fail not to strongly adhere to the cleaned portion.

The material, the shape, etc. of the contact pin cleaner employed in the present invention are not particularly limited, and they may be utilized widely. For example, the plastic film such as polyethylene, polyethylene terephthalate, acetylcellulose, polycarbonate, polypropylene, polyamide, polyimide, polycarbodiimide, etc., the rubber resin such as the silicon, the material obtained by coating the abrasive grain such as alumina fine-grain, silicon carbide, chromium oxide, etc. on the base material (backing) such as nonwoven fabric, etc. are employed, but the material is not limited to the above. Similarly, the shape may be employed appropriately according to the shape of the socket or the IC, that is to be cleaned, such as the silicon wafer shape, the IC chip shape, etc. and the type of the equipment.

According to such configuration, the cleaning sheet is stuck onto the non-cleaned side of the cleaning contact pin cleaner for the contact pin or the conveying member such as various substrates, etc. via the ordinary adhesive layer, and then conveyed as the conveying member with the cleaning function in the equipment to come into contact with the chuck table, etc., whereby the cleaning is carried out.

The conveying member to which the cleaning layer is provided is not particularly limited. For example, the substrate for the flat panel display such as the semiconductor wafer, LCD, PDP, etc., the substrate for the compact disk, the MR head, the plastic film such as polyethylene, polyethylene terephthalate, acetylcellulose, polycarbonate, polypropylene, polyamide, polyimide, polycarbodiimide, etc., for example, may be listed.

The present invention provides a method of manufacturing the conveying member with the cleaning function for various substrate processing equipments, for example, a method of manufacturing the conveying member with the cleaning function for the substrate processing equipment such as the manufacturing equipment, the inspection equipment, etc. of the semiconductor device, the flat panel display, the printed substrate, etc., that are very sensitive to the foreign matter.

As for the method of manufacturing the conveying member with the cleaning function (referred to as a cleaning member hereinafter), for example, in the case that the cleaning member is manufactured by sticking the cleaning sheet onto the conveying member such as the substrate, etc., if the cleaning sheet that is larger than the shape of the member is stuck to the member and then the cleaning sheet is cut along the shape of the member (this method is referred to as a direct cutting method hereinafter), the problem that is caused since cutting scobs are generated from the cleaning layer, etc. in cutting the sheet and then adhered to the cleaning member and the equipment. Also, in case the cleaning member is manufactured by sticking the label cleaning sheet, that is processed previously into the shape of the member, to the conveying member, the generation of the cutting scobs in working the label can be suppressed rather than the direct cutting method. But the cutting of the label sheet must be performed previously to increase the operation steps, and thus the fabrication of the cleaning member becomes troublesome to thus degrade the workability.

In light of such circumstance, the present invention has an object to provide a method of manufacturing a cleaning member that can be conveyed in the substrate processing equipment without fail, and can remove simply and surely the adhered foreign matter, and also does not generate the cutting scobs in cutting the sheet by the direct cutting method.

In order to achieve the above object, as the result of the earnest study, the inventors of the present invention have found out that, if the cleaning layer is formed of the adhesive that is polymerized/cured by the active energy when the cleaning member is manufactured by the direct cutting method upon manufacturing the cleaning member by sticking the cleaning sheet onto the conveying member such as the substrate, etc. and if the polymerizing/curing reaction of the cleaning layer is carried out after the cleaning sheet is cut out into the shape of the conveying member, the cleaning member capable of releasing simply the foreign matter without fail can be manufactured without generation of the above problem, and thus reach the completion of the present invention.

That is, the present invention also provides a method of manufacturing a conveying member with a cleaning function, for sticking the cleaning sheet, in which the cleaning layer formed of the adhesive that is polymerized/cured by the active energy is provided onto one surface of the base material and the ordinary adhesive layer is provided onto the other surface thereof, onto the conveying member via the ordinary adhesive layer to have a shape larger than the shape of the conveying member and then cutting the cleaning sheet along the shape of the conveying member, wherein the polymerizing/curing reaction of the cleaning layer is carried out after the cleaning sheet is cut into the shape of the conveying member.

In the method of manufacturing the conveying member of the present invention, the cleaning layer must be formed of the adhesive that is polymerized/cured by the active energy and the polymerizing/curing reaction of the cleaning layer must be carried out after the cleaning sheet is cut. This is because, if the polymerizing/curing reaction of the cleaning layer is carried out prior to the cutting of the cleaning sheet, the cleaning layer has the high modulus of elasticity because of the crosslinking reaction and also a large amount of cutting scobs are generated in cutting and adhered to the cleaning member and the equipment. In order not to generate the cutting scobs from the cleaning layer in cutting the sheet, it is desired that the modulus of elasticity in tension of the cleaning layer (test method JIS K7127) should be not more than 1 $N/mm^2$, preferably not more than 0.1 $N/mm^2$. The generation of the cutting scobs from the cleaning layer in cutting the sheet can be suppressed by setting the modulus of elasticity in tension lower than such specific value, and thus the cleaning member to which the cutting scobs are not adhered can be manufactured by the direct cutting method. Also, if the adhesive that is polymerized/cured is employed as the cleaning layer, the adhesiveness is lost substantially from the cleaning layer by polymerizing/curing the cleaning layer after the cutting of the sheet. Thus, there can be obtained the advantage that the cleaning member that never strongly comes into contact with the contact portion of the equipment in conveying the cleaning member and can be conveyed surely can be provided.

In the present invention, it is desirable that, since the crosslinking reaction and the curing are accelerated by the above active energy, the modulus of elasticity in tension of such cleaning sheet after the cutting of the sheet should be not less than 10 $N/mm^2$, preferably 10 to 2000 $N/mm^2$. The performance for removing the foreign matter adhered to the conveying system is lowered if this modulus of elasticity in tension is in excess of 2000 $N/mm^2$, whereas there is the possibility that the cleaning layer is adhered to the cleaned portion in the equipment in conveying to cause the conveying trouble if the modulus of elasticity in tension is smaller than 10 $N/mm^2$.

In manufacturing the cleaning member according to the present invention, there is employed the cleaning sheet in which the cleaning layer formed of the adhesive that is polymerized/cured by the active energy is provided onto one surface of the base material while the ordinary adhesive layer is provided onto the other surface thereof.

The present invention will be explained based on examples hereinafter, but the present invention is not limited to these examples. Hereinafter, the term “parts” means parts by weight.

EXAMPLE 1

The ultraviolet curing adhesive solution was formed by mixing uniformly the polyethylene glycol dimethacrylate 50 parts, the urethane acrylate 50 parts, the benzyldimethylketal 3 parts, and the diphenylmethanediisocyanate 3 parts into the acrylic polymer (weight-average molecular weight 700000) 100 parts obtained from the monomer mixed solution consisting of the acrylic acid-2-ethyl hexyl 75 parts, the methyl acrylate 20 parts, and the acrylic acid 5 parts.

In contrast, the ordinary adhesive layer was provided by coating the adhesive solution, that was obtained in the same way except that the benzyldimethylketal was removed from the above adhesive, on one surface of the polyester base material film, that had a width of 250 mm and a thickness of 25 $\mu$m, to have a thickness of 10 $\mu$m after the drying, whereby the polyester releasing film of 38 $\mu$m thickness was pasted on the surface. The adhesive layer is provided as the cleaning layer by coating the above ultraviolet curing adhesive solution on another side of the base material film to have a dried thickness of 40 $\mu$m, whereby the similar releasing film was pasted on the surface.

The cleaning sheet of the present invention was obtained by irradiating the ultraviolet rays having a central wavelength 365 nm by an integrated quantity of light 1000 $mJ/cm^2$ onto this sheet. When the surface resistivity was measured via the cleaning layer by the surface resistivity measuring device (type MCP-UP450 manufactured by Mitsubishi Chemical Industries Ltd.) at the temperature of 23° C. and the humidity of 60% after the releasing film on the cleaning layer side of this cleaning sheet was peeled off, it was impossible to measure the surface resistivity if such surface resistivity exceeds $9.99\times10^{13}$ Ω/□.

Also, when the adhesive layer on the cleaning layer side was pasted onto the mirror surface of the silicon wafer to have a width of 10 mm and then the 180° releasing adhesive force for the silicon wafer was measured based on JIS Z0237, 0.078 N/10 mm was obtained.

The conveying cleaning wafer with the cleaning function was fabricated by peeling off the releasing film on the ordinary adhesive layer side of this cleaning sheet and then pasting this film onto a back surface (mirror surface) of the 8-inch silicon wafer by the hand roller.

In contrast, when two wafer stages of the substrate processing equipment were removed and then the number of the foreign matter having a size of not less than 0.3 μm was counted by the laser foreign-matter measuring device, 25000 foreign matters were counted in one area of the 8-inch silicon wafer size and 22000 foreign matters were counted in another area thereof.

Then, when the releasing film on the cleaning layer side of the resultant conveying cleaning wafer was peeled off and then the wafer was conveyed into the substrate processing equipment that has the wafer stage to which the 25000 foreign matters were adhered, the wafer could be conveyed without trouble. Then, when the wafer stage was removed and the number of the foreign matter having a size of more than 0.3 μm was counted by the laser foreign-matter measuring device, 6200 foreign matters were counted in the 8-inch silicon wafer size. Thus, the foreign matters adhered before the cleaning could be removed in number by ¾ or more.

Comparative Example 1

When the cleaning sheet was fabricated in the same way as Example 1 other than that the additive (product name V-SQ-S6 manufactured by Mitsubishi Chemical Industries Ltd.) 5 parts that have the 4-th class ammonium salt having the conducting function in the side chain was added into the adhesive layer of the cleaning layer and then the surface resistivity of the cleaning layer was measured in the same way, $5.5\times10^{11}$ Ω/□ was obtained. Also, when the adhesive force of the adhesive layer of the cleaning layer to the silicon wafer was measured, 0.33 N/10 mm was obtained.

When the conveying cleaning wafer fabricated in the same way as Example 1 from this cleaning sheet is conveyed into the substrate processing equipment that has the wafer stage to which the 22000 foreign matters are adhered, the wafer can be conveyed without trouble. Then, when the wafer stage was removed and the number of the foreign matter having a size of not less than 0.3 μm was counted by the laser foreign-matter measuring device, 20000 foreign matters were counted in the 8-inch silicon wafer size. Thus, the foreign matters adhered before the cleaning could be removed in number merely by about 1/11.

EXAMPLE 2

The ultraviolet curing adhesive solution was formed by mixing uniformly the dipentaerythritolhexacrylate (product name UV1700B manufactured by The Nippon Synthetic Chemical Industry, Co., Ltd.) 150 parts, the benzyldimethylketanol 5 parts, and the diphenylmethanediisocyanate 3 parts into the acrylic polymer (weight-average molecular weight 700000) 100 parts obtained from the monomer mixed solution consisting of the acrylic acid-2-ethyl hexyl 75 parts, the methyl acrylate 20 parts, and the acrylic acid 5 parts.

In contrast, the adhesive solution was obtained in the same way as above except that the benzyldimethylketanol is removed from the above adhesive.

The ordinary adhesive layer was provided by coating the above adhesive solution on one surface of the polyethylene terephthalate, that had a width of 250 mm and a thickness of 25 μm, as the base material to have a dried thickness of 10 μm, whereby the polyester releasing film of 38 μm thickness was pasted on the surface. Also, the adhesive layer was provided as the cleaning layer by coating the above ultraviolet curing adhesive solution on the other side of the base material to have a dried thickness of 20 μm, whereby the similar releasing film was pasted on the surface.

The cleaning sheet A of the present invention was obtained by irradiating the ultraviolet rays having a central wavelength 365 nm by an integrated quantity of light 2000 $mJ/cm^2$ onto this sheet. When the relative dielectric constant of the cleaning layer of this cleaning sheet was measured by the LCR meter (Type 4284A manufactured by Hewlett Packard Co., Ltd.) at 1 MHz, 2.8 was obtained.

EXAMPLE 3

The cleaning sheet B of the present invention was obtained by providing the ordinary adhesive layer in the same way as Example 2 on one surface of the polyethylene terephthalate film (width 250 mm, thickness 25 μm) whose relative dielectric constant is 3.2 and then pasting the similar releasing film on the surface.

The conveying cleaning wafers A and B with the cleaning function were fabricated by peeling off the releasing film on the ordinary adhesive layer side of the resultant cleaning sheets A and B and then pasting the film on the back surface (mirror surface) of the 8-inch silicon wafer by the hand roller.

In contrast, when the foreign matters having a size of more than 0.2 μm on the mirror surfaces of three sheets of new 8-inch silicon wafers were counted by the laser foreign-matter measuring device, 11 foreign matters were counted on the first sheet, 10 foreign matters were counted on the second sheet, and 8 foreign matters were counted on the third sheet. When these wafers were conveyed into the substrate processing equipment that has separate electrostatic adsorbing mechanisms while directing the mirror surface downward and then the mirror surfaces were measured by the laser foreign-matter measuring equipment, 32004, 25632, and 27484 foreign matters were counted in the area of the 8-inch wafer size respectively.

Then, when the releasing films on the cleaning layer side of the resultant conveying cleaning wafers A, B were peeled off and then the wafers were conveyed into the substrate processing equipment that has the wafer stages to which the above 32004 and 27484 foreign matters were adhered respectively, the wafer could be conveyed without trouble. Then, the new 8-inch silicon wafers to which 10 and 13 foreign matters having a size of not less than 0.2 μm were conveyed while directing the mirror surface downward and then the foreign matters having the size of not less than 0.2 μm were counted by the laser foreign-matter measuring device. This process was carried out five times, and the results are shown in Table 1.

Comparative Example 3

The cleaning sheet C was obtained in the same way as Example 3 other than that the polytetrafluoroethylene whose relative dielectric constant is 2.0 was used as the film in Example 3.

The conveying cleaning wafer C that was fabricated in the same way as Example 3 from the cleaning sheet was conveyed into the substrate processing equipment that has the wafer stage to which the 25632 foreign matters were adhered. This operation was repeated five times like Example 3, and the results are shown in Table 1.

TABLE 1

| | Foreign-matter rejection ratio | | | | |
|---|---|---|---|---|---|
| | 1 sheet conveyed | 2 sheets conveyed | 3 sheets conveyed | 4 sheets conveyed | 5 sheets conveyed |
| Example 2 Wafer A | 84% | 90% | 96% | 96% | 96% |
| Example 3 Wafer B | 69% | 72% | 73% | 73% | 75% |
| Comparative Example 3 Wafer C | 19% | 20% | 19% | 21% | 21% |

EXAMPLE 4

The ultraviolet curing adhesive solution was prepared by mixing uniformly the polyethylene glycol 200 dimethacrylate (product name NKester4G manufactured by Shin-Nakamura Chemical Co., Ltd.) 50 parts, the urethane acrylate (product name U-N-01 manufactured by Shin-Nakamura Chemical Co., Ltd.) 50 parts, and the polyisocyanate compound (product name Colonate L manufactured by Nippon Polyurethane Industry Co., Ltd.) 3 parts, and the benzyldimethylketal (product name Illugacure 651 manufactured by Chiba-Speciality Chemicals Co., Ltd.) 3 parts as the photopolymerization initiator into the acrylic polymer (weight-average molecular weight 700000) 100 parts obtained from the monomer mixed solution consisting of the acrylic acid-2-ethyl hexyl 75 parts, the methyl acrylate 20 parts, and the acrylic acid 5 parts.

In contrast, the ordinary adhesive layer was provided by coating the adhesive solution, that was obtained in the same way except that the benzyldimethylketal as the photopolymerization initiator was removed from the above adhesive solution A, on one surface of the polyester base material film, that had a width of 250 mm and a thickness of 25 $\mu$m, to have the dried thickness of 10 $\mu$m, whereby the polyester releasing film of 38 $\mu$m thickness was pasted on the surface. Then, the adhesive layer as the cleaning layer was provided by coating the above ultraviolet curing adhesive solution A on the other side of the base material film to have the dried thickness of 10 $\mu$m, whereby the similar releasing film was pasted on the surface.

The cleaning sheet of the present invention was obtained by irradiating the ultraviolet rays having a central wavelength 365 nm until an integrated quantity of light 1000 $mJ/cm^2$ onto this sheet. Then, the releasing film on the cleaning layer side of this cleaning sheet was peeled off. The measured surface free energy of the cleaning layer was 40.1 $mJ/m^2$, and the measured contact angle with respect to water was 78.2 degree.

The conveying cleaning wafer with the cleaning function was fabricated by peeling off the releasing film on the ordinary adhesive layer side of this cleaning sheet and then pasting this film onto a back surface (mirror surface) of the 8-inch silicon wafer by the hand roller.

In contrast, when two wafer stages of the substrate processing equipment were removed and then the number of the foreign matter having a size of not less than 0.3 $\mu$m was counted by the laser foreign-matter measuring device, 25000 foreign matters were counted in one area of the 8-inch silicon wafer size and 23000 foreign matters were counted in another area thereof.

Then, when the releasing film on the cleaning layer side of the resultant conveying cleaning wafer was peeled off and then the wafer was conveyed into the substrate processing equipment that has the wafer stage to which the 25000 foreign matters are adhered, the wafer could be conveyed without trouble. Then, when the wafer stage was removed and the number of the foreign matter having a size of more than 0.3 $\mu$m was counted by the laser foreign-matter measuring device, 4800 foreign matters were counted in the 8-inch silicon wafer size. Thus, the foreign matters adhered before the cleaning could be removed in number by ⅘ or more.

Comparative Example 4

A cleaning sheet was formed in the same manner as the Example 4 except for using an ultraviolet curing adhesive solution B prepared by mixing uniformly the dipentaerythtorolhexaacrylate (product name UV1700B manufactured by The Nippon Synthetic Chemical Industry, Co., Ltd.) 100 parts, and the polyisocyanate compound (product name Colonate L manufactured by Nippon Polyurethane Industry Co., Ltd.) 3 parts, and the benzyldimethylketal (product name Illugacure 651 manufactured by Chiba-Speciality Chemicals Co., Ltd.) 10 parts as the photopolymerization initiator into the acrylic polymer (weight-average molecular weight 2800000) 100 parts obtained from the monomer mixed solution consisting of the acrylic acid-2-ethyl hexyl 30 parts, the methyl acrylate 70 parts, and the acrylic acid 10 parts. The measured surface free energy of the cleaning layer was 24.6 $mJ/m^2$, and the measured contact angle with respect to water was 82.3 degree.

Then, a conveying cleaning wafer obtained by the same manner as in the Example 4 was conveyed into the substrate processing equipment that has the wafer stage to which the 23000 foreign matters are adhered, the wafer could be conveyed without trouble. Then, when the wafer stage was removed and the number of the foreign matter having a size of more than 0.3 $\mu$m was counted by the laser foreign-matter measuring device, 20000 foreign matters were counted in the 8-inch silicon wafer size. Thus, the foreign matters adhered before the cleaning could be removed only in number by about ⅛.

EXAMPLE 5

The ultraviolet curing adhesive solution was formed by mixing uniformly the dipentaerythtorolhexaacrylate (product name UV1700B manufactured by The Nippon Synthetic Chemical Industry, Co., Ltd.) 150 parts, the benzyldimethylketanol 5 parts, and the diphenylmethanediisocyanate 3 parts into the acrylic polymer (weight-average molecular weight 700000) 100 parts obtained from the monomer mixed solution consisting of the acrylic acid-2-ethyl hexyl 75 parts, the methyl acrylate 20 parts, the acrylic acid 5 parts.

In contrast, the ordinary adhesive layer was provided by coating the adhesive solution, that is obtained in the same way except that the benzyldimethylketal was removed from the above adhesive, on one surface of the polyethylene terephthalate base material film, that has a width of 250 mm, a thickness of 70 $\mu$m, and a tensile strength of 250 Mpa to have the dried thickness of 10 $\mu$m, whereby the polyester releasing film of 38 $\mu$m thickness was pasted on the surface. The cleaning layer was provided by coating the above ultraviolet curing adhesive solution on the other side of the base material film to have the dried thickness of 40 $\mu$m, whereby the similar releasing film was pasted on the surface.

The ultraviolet rays having a central wavelength 365 nm was irradiated by an integrated quantity of light 2000 mJ/cm$^2$ onto this sheet from the cleaning layer side, then the releasing film on the cleaning layer side is peeled off, then the cleaning layer was inserted between the electrodes in the atmosphere by employing the thermal electret method, then the voltage of 20 kV is applied at the temperature of 100° C., then the cleaning layer was cooled down to 40° C. while applying the voltage as it is, and then the application of the voltage was ended to form the cleaning layer as the electret. When the surface potential was measured at an electrode-sample interval of 20 mm by the static electricity measuring device (Model FMX002 manufactured by Simco Japan Co. Ltd.) under conditions of 25° C. and 55% RH, 15 kV was obtained. Also, the surface of the cleaning layer did not substantially have the tackiness, and the modulus of elasticity in tension of the cleaning layer after the ultraviolet curing was 1980 N/mm$^2$.

The conveying cleaning wafer with the cleaning function was fabricated by peeling off the releasing film on the ordinary adhesive layer side of the resultant cleaning sheet and then pasting the film on the back surface (mirror surface) of the 8-inch silicon wafer by the hand roller.

In contrast, when the foreign matters having a size of more than 0.2 μm on the mirror surfaces of two sheets of new 8-inch silicon wafers are counted by the laser foreign-matter measuring device, 11 foreign matters were counted on the first sheet, and 10 foreign matters were counted on the second sheet. When these wafers were conveyed into the substrate processing equipment that has separate electrostatic adsorbing mechanisms while directing the mirror surface downward and then the mirror surfaces are measured by the laser foreign-matter measuring equipment, 32004 and 25632 foreign matters were counted in the area of the 8-inch wafer size respectively.

Then, when the releasing film on the cleaning layer side of the resultant conveying cleaning wafer was peeled off and then the wafer is conveyed into the substrate processing equipment that has the wafer stages to which the above 32004 and 27484 foreign matters were adhered respectively, the wafer can be conveyed without trouble. Then, the new 8-inch silicon wafers to which the 10 foreign matters having the size of more than 0.2 μm were conveyed while directing the mirror surface downward and then the foreign matters having the size of more than 0.2 μm were counted by the laser foreign-matter measuring device. This process was repeated five times, and the results are shown in Table 2.

Comparative Example 5

When the cleaning sheet was obtained in the same way as Example 5 other than that the additive (product name V-SQ-S6 manufactured by Mitsubishi Chemical Industries Ltd.) 20 parts that have the 4-th class ammonium salt having the conducting function in the side chain was added into the cleaning layer in the cleaning sheet in Example 5. The surface potential of the cleaning layer measured after the irradiation of the ultraviolet rays like Example 5 was 0.04 kV, and the modulus of elasticity in tension was 1720 N/mm$^2$.

The conveying cleaning wafer that was fabricated in the same way as Example 5 from the cleaning sheet was carried out five times into the substrate processing equipment that has the wafer stage to which the 25632 foreign matters were adhered, like Example 5. The results are shown in Table 2.

TABLE 2

| | Foreign-matter rejection ratio | | | | |
|---|---|---|---|---|---|
| | 1 sheet conveyed | 2 sheets conveyed | 3 sheets conveyed | 4 sheets conveyed | 5 sheets conveyed |
| Example 5 | 84% | 90% | 96% | 96% | 96% |
| Comparative Example 5 | 20% | 23% | 23% | 30% | 31% |

EXAMPLE 6

The ultraviolet curing adhesive solution was prepared by mixing uniformly the polyethylene glycol 200 dimethacrylate (product name NKester4G manufactured by Shin-Nakamura Chemical Co., Ltd.) 50 parts, the urethane acrylate (product name U-N-01 manufactured by Shin-Nakamura Chemical Co., Ltd.) 50 parts, and the polyisocyanate compound (product name Colonate L manufactured by Nippon Polyurethane Industry Co., Ltd.) 3 parts, and the benzyldimethylketal (product name Illugacure 651 manufactured by Chiba-Speciality Chemicals Co., Ltd.) 3 parts as the photopolymerization initiator into the acrylic polymer (weight-average molecular weight 700000) 100 parts obtained from the monomer mixed solution consisting of the acrylic acid-2-ethyl hexyl 75 parts, the methyl acrylate 20 parts, and the acrylic acid 5 parts.

In contrast, the ordinary adhesive layer was provided by coating the adhesive solution, that was obtained in the same way except that the benzyldimethylketal as the photopolymerization initiator was removed from the above adhesive solution A, on one surface of the polyester base material film, that has a width of 250 mm and a thickness of 25 μm, to have the dried thickness of 10 μm, whereby the polyester releasing film of 38 μm thickness was pasted on the surface. Then, the adhesive layer as the cleaning layer was provided by coating the above ultraviolet curing adhesive solution A on the other side of the base material film to have the dried thickness of 10 μm, whereby the similar releasing film was pasted on the surface.

The cleaning sheet of the present invention was obtained by irradiating the ultraviolet rays having a central wavelength 365 nm until an integrated quantity of light 1000 mJ/cm$^2$ onto this sheet. Then, the releasing film on the cleaning layer side of this cleaning sheet was peeled off, the coefficient of friction of the cleaning layer after the ultraviolet rays curing was 1.7, and the modulus of elasticity in tension of the cleaning layer after the ultraviolet curing was 50 N/mm$^2$. Here, the coefficient of friction was calculated by moving the stainless steel plate of 50 mm×50 mm under the vertical load 9.8 N at a velocity of 300 mm/min along the predetermined direction in parallel with the surface of the cleaning layer, and then measuring the frictional resistance force generated at that time by the universal tension tester. Also, the modulus of elasticity in tension was measured based on the test method JIS K7127.

The conveying cleaning wafer with the cleaning function was fabricated by peeling off the releasing film on the ordinary adhesive layer side of this cleaning sheet and then pasting the film on the back surface (non-cleaned surface) of the contact pin cleaner (product name Passchip manufactured by PASS Co., Ltd.) as the contact pin cleaning member for the 8-inch silicon wafer shape by the hand roller.

Then, when the cleaning of the contact pins and the cleaning of the chuck table were by peeling off the releasing film on the cleaning layer side of the cleaning member and then dummy-conveying through the wafer probe as the conduction testing device in the semiconductor manufacturing, the cleaning layer was not strongly brought into contact with the contact portion at all and thus the cleaning layer could be conveyed without problem.

Also, when the contact pins were watched by the microscope thereafter, the foreign matters such as the oxide, etc. adhered to the pin before the cleaning were eliminated, and their cleaning can be checked. Also, the silicon waste having a size of about 1 mm, etc. appeared on the chuck table before the cleaning could be completely cleaned, and their cleaning could be found. Then, when 25 sheets of product wafers were conveyed to perform the test actually, the process could be carried out not to cause the problem.

EXAMPLE 7

The ultraviolet curing adhesive solution A was prepared by mixing uniformly the polyethylene glycol 200 dimethacrylate (product name NKester4G manufactured by Shin-Nakamura Chemical Co., Ltd.) 50 parts, the urethane acrylate (product name U-N-01 manufactured by Shin-Nakamura Chemical Co., Ltd.) 50 parts, and the polyisocyanate compound (product name Colonate L manufactured by Nippon Polyurethane Industry Co., Ltd.) 3 parts, and the benzyldimethylketal (product name Illugacure 651 manufactured by Chiba-Speciality Chemicals Co., Ltd.) 3 parts as the photopolymerization initiator into the acrylic polymer (weight-average molecular weight 700000) 100 parts obtained from the monomer mixed solution consisting of the acrylic acid-2-ethyl hexyl 75 parts, the methyl acrylate 20 parts, and the acrylic acid 5 parts.

In contrast, the normal pressure-sensitive adhesive solution A was obtained in the same way as above except that the benzyldimethylketanol was removed from the above adhesive.

The ordinary adhesive layer was provided by coating the above pressure-sensitive adhesive solution A on one surface of the polyester base material film, that had a width of 250 mm and a thickness of 25 $\mu$m, to have a dried thickness of 10 $\mu$m, whereby the polyester releasing film of 38 $\mu$m thickness was pasted on the surface. Also, the adhesive layer was provided as the cleaning layer by coating the above ultraviolet curing adhesive solution A on the other side of the base material to have the dried thickness of 30 $\mu$m, whereby the similar releasing film was pasted on the surface. Thus, the cleaning sheet A was fabricated.

When the modulus of elasticity in tension (test method JIS K7127) of this ultraviolet curing adhesive solution A was measured, 0.1 N/mm$^2$ was obtained if the curing reaction was executed by the ultraviolet rays, while 49 N/mm$^2$ was obtained after the ultraviolet rays having the central wavelength 365 nm were irradiated up to the integrated quantity of light 1000 mJ/cm$^2$.

By using this cleaning sheet A, the sheet was pasted onto the wafer by the direct cutting system tape sticker (NEL-DR8500II manufactured by Nitto Seiki Co., Ltd.). At this time, the sheet A was pasted onto the back surface (mirror surface) of the 8-inch silicon wafer and then cut into the wafer shape by the direct cut. When this operation for 25 sheets was carried out successively, the cutting scobs were not generated at all in cutting the sheet.

Then, the conveying cleaning wafer A with the cleaning function was fabricated by irradiating the ultraviolet rays having the central wavelength 365 nm to five sheets of these wafers up to the integrated quantity of light 1000 mJ/cm$^2$.

In contrast, when the foreign matters having a size of more than 0.2 $\mu$m on the mirror surfaces of four sheets of new 8-inch silicon wafers were counted by the laser foreign-matter measuring device, 8 foreign matters were counted on the first sheet, 11 foreign matters were counted on the second sheet, 9 foreign matters were counted on the third sheet, and 5 foreign matters were counted on the fourth sheet. When these wafers were conveyed into the substrate processing equipment that has separate electrostatic adsorbing mechanisms while directing the mirror surface downward and then the mirror surfaces were measured by the laser foreign-matter measuring equipment, 31254, 29954, 28683 and 27986 foreign matters were counted in the first, second, third, and fourth areas of the 8-inch wafer size respectively.

Then, when the releasing film on the cleaning layer side of the resultant conveying cleaning wafer A was peeled off and then the wafer was conveyed into the substrate processing equipment that has the wafer stage to which the above 31254 foreign matters were adhered, the wafer could be conveyed without trouble. Then, the new 8-inch silicon wafers to which the 10 foreign matters having the size of more than 0.2 $\mu$m were conveyed while directing the mirror surface downward and then the foreign matters having the size of more than 0.2 $\mu$m were counted by the laser foreign-matter measuring device. This operation was repeated five times, and the results are shown in Table 3.

EXAMPLE 8

The cleaning sheet B was prepared in the same way as Example 7 except that the ultraviolet curing adhesive solution B, that was obtained by mixing uniformly the multi-functional urethane acrylate (product name UV1700B manufactured by The Nippon Synthetic Chemical Industry, Co., Ltd.) 100 parts and the polyisocyanate compound (product name Colonate L manufactured by Nippon Polyurethane Industry Co., Ltd.) 3 parts, and the benzyldimethylketal (product name Illugacure 651 manufactured by Chiba-Speciality Chemicals Co., Ltd.) 10 parts as the photopolymerization initiator into the acrylic polymer (weight-average molecular weight 2800000) 100 parts obtained from the monomer mixed solution consisting of the acrylic acid-2-ethyl hexyl 75 parts, the methyl acrylate 20 parts, and the acrylic acid 5 parts, as the ultraviolet curing adhesive. When the modulus of elasticity in tension of this ultraviolet curing adhesive B was measured, 0.01 N/mm$^2$ was obtained before the curing, while 1440 N/mm$^2$ was obtained after the ultraviolet rays having the central wavelength 365 nm were irradiated up to the integrated quantity of light 1000 mJ/cm$^2$.

When 25 sheets of wafers with sheets were fabricated by the direct cutting system using this cleaning sheet B like Example 7, the cutting scobs were not generated at all in cutting the sheet. Then, the conveying cleaning wafer B with the cleaning function was fabricated by irradiating the ultraviolet rays having the central wavelength 365 nm to five sheets of these wafers up to the integrated quantity of light 1000 mJ/cm$^2$.

Then, when the releasing film on the cleaning layer side of the resultant conveying cleaning wafer A was peeled off and then the wafer was conveyed into the substrate processing equipment that has the wafer stage to which the above 29954 foreign matters are adhered, the wafer could be conveyed without trouble. Then, the new 8-inch silicon wafers to which the 10 foreign matters having the size of more than 0.2 $\mu$m were conveyed while directing the mirror surface downward and then the foreign matters having the size of more than 0.2 $\mu$m were counted by the laser foreign-matter measuring device. This operation was repeated five times, and the results are shown in Table 3.

Comparative Example 7

When the wafers with sheets were fabricated by the direct cutting system similarly except that the cleaning sheet C was fabricated by irradiating the ultraviolet rays having the central wavelength 365 nm up to the integrated quantity of light 1000 $mJ/cm^2$ before the wafer was pasted onto the cleaning sheet A in Example 7, a large amount of cutting scobs were generated from the cleaning layer in cutting the sheet. Thus, a number of cutting scobs were stuck onto the edges of the wafers with the sheet, the back surface of the wafer, and the tape pasting device. Accordingly, the fabrication of the wafer C with the sheet was interrupted.

Comparative Example 8

The cleaning sheet D was fabricated in the same way as Example 7 except that the pressure-sensitive adhesive solution A shown in Example 8 was employed as the adhesive for the cleaning layer. In this case, the modulus of elasticity in tension of the cleaning layer was 0.1 $N/mm^2$.

When the wafers with sheets were fabricated by the direct cutting system in the same way as Example 7 from the cleaning sheet D, no cutting scob was generated in cutting the sheet and thus 25-sheets of wafers could be fabricated. When these conveying cleaning wafers D were conveyed into the substrate processing equipment that has the wafer stage to which the 27986 foreign matters were adhered, the first wafer wais stuck to the wafer stage and thus could not be conveyed.

4. A cleaning sheet according to claim 1, wherein a relative dielectric constant of the cleaning layer is larger than 2.0.

5. A cleaning sheet according to claim 1, wherein a surface free energy of the cleaning layer is not less than 30 $mJ/m^2$.

6. A cleaning sheet according to claim 5, wherein a contact angle with respect to water of the cleaning layer is not more than 90 degrees.

7. A cleaning sheet according to claim 1, wherein a surface potential of the cleaning layer exceeds 10 kV.

8. A cleaning sheer according to claim 7, wherein the cleaning layer is formed as an electret by a thermal electret method.

9. A cleaning sheet according to claim 1, wherein the cleaning layer does not substantially have a tackiness.

10. A cleaning sheet according to claim 1, wherein a modulus of elasticity in tension according to test method JIS K7127 of the cleaning layer is 1 to 3000 $N/mm^2$.

11. A cleaning sheet according to claim 1, wherein the cleaning layer is formed of an adhesive layer that is cured by an active energy.

12. A conveying member with a cleaning function in which the cleaning sheet set forth in claim 3 is provided to a conveying member via an adhesive layer.

13. A substrate processing equipment cleaning method of conveying the cleaning sheet set forth in claim 1 or the conveying member set forth in claim 12 into a substrate processing equipment.

14. A cleaning member which is a cleaning member for a conduction testing equipment and in which the cleaning sheet set forth in claim 1 for removing foreign matters adhered onto a contacted surface of the equipment, with which a contact pin cleaner comes into contact, is provided to one surface of a member for removing foreign matters adhered to a conduction testing contact pin of the equipment.

TABLE 3

| | Foreign-matter rejection ratio | | | | |
|---|---|---|---|---|---|
| | 1 sheet conveyed | 2 sheets conveyed | 3 sheets conveyed | 4 sheets conveyed | 5 sheets conveyed |
| Example 7 | 85% | 92% | 96% | 96% | 96% |
| Example 8 | 70% | 75% | 83% | 83% | 83% |
| Comparative Example 7 | (manufacturing of the cleaning wafer was stopped) | | | | |
| Comparative Example 8 | conveyance trouble occurred | conveyance stopped | conveyance stopped | conveyance stopped | conveyance stopped |

Industrial Applicability

As described above, according to the cleaning sheet of the present invention, the substrate can be conveyed in the substrate processing equipment without fail and also the foreign matters adhered onto the equipment can be simply reduced.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A cleaning sheet comprising a cleaning layer having a surface resistivity more than $1\times10^{13}$ Ω/□.

2. A cleaning sheet set forth in claim 1, further comprising a base material for supporting said cleaning layer.

3. A cleaning sheet set forth in claim 1, further comprising:

a base material having one surface on which said cleaning layer is provide; and an adhesive layer being on an other surface of said base material.

15. A cleaning member which is a cleaning member for a conduction testing equipment and in which a contact pin cleaner for removing foreign matters adhered onto a conduction testing contact pin of the equipment is provided to one surface of a conveying member, and the cleaning sheet set forth in claim 1 for removing the foreign matters adhered to a contacted surface of the equipment, with which the contact pin cleaner comes into contact, is provided to an other surface of the conveying member.

16. A cleaning member according to any one of claims 14 and 15, wherein, in the cleaning sheet, an adhesive layer is provided onto one surface of a base material and a cleaning layer for removing the foreign matters adhered to the contacted surface of the equipment, with which the contact pin cleaner comes into contact, is provided onto an other surface of the base material.

17. A cleaning sheet according to claim 1, wherein a coefficient of friction of the cleaning layer is not less than 1.0.

18. A cleaning sheet according to claim 1, wherein the adhesive layer is a curing adhesive that contains a pressure-sensitive adhesive polymer, a polymerized unsaturated compound that has one upsaturated double bond or more in a molecule, and a polymerization initiator.

19. A conduction tester cleaning method of conveying the cleaning member set forth in any one of claims 14 and 15 into a conduction tester.

* * * * *